United States Patent
Parsons

[11] Patent Number: 5,108,351
[45] Date of Patent: Apr. 28, 1992

[54] BELT DRIVES

[75] Inventor: Bryan N. V. Parsons, Stoney Stanton, United Kingdom

[73] Assignee: Jaguar Cars Limited, United Kingdom

[21] Appl. No.: 609,581

[22] Filed: Nov. 6, 1990

[30] Foreign Application Priority Data

Nov. 15, 1989 [GB] United Kingdom ............... 8925870

[51] Int. Cl.⁵ .............................................. F16G 1/00
[52] U.S. Cl. ................................................ 474/237
[58] Field of Search ............. 474/237, 265, 148, 184, 474/49, 52; 156/137–140

[56] References Cited

U.S. PATENT DOCUMENTS

| | | | |
|---|---|---|---|
| 2,086,804 | 7/1937 | Hjartsater | 474/265 |
| 2,442,037 | 5/1948 | Carter et al. | 474/265 X |
| 2,920,494 | 1/1960 | Dodwell | 474/265 X |
| 3,851,535 | 12/1974 | Presentey | 474/237 X |
| 4,019,399 | 4/1977 | Waugh | 156/140 X |
| 4,516,960 | 5/1985 | Rathert | 474/49 |
| 4,591,351 | 5/1986 | Kumm | 474/49 |
| 4,714,452 | 12/1987 | Kumm | 474/49 |

FOREIGN PATENT DOCUMENTS

| | | |
|---|---|---|
| 0122869 | 10/1984 | European Pat. Off. |
| 0447236 | 5/1936 | United Kingdom . |
| 969468 | 9/1964 | United Kingdom . |
| 1414357 | 11/1975 | United Kingdom . |

Primary Examiner—Thuy M. Bui
Attorney, Agent, or Firm—Davis, Bujold & Streck

[57] ABSTRACT

A belt drive has a pair of pulleys mounted for rotation in a common plane about parallel axes and a belt drivingly mounted about said pulleys, said belt being formed as a band of material having a curved transverse section.

8 Claims, 2 Drawing Sheets

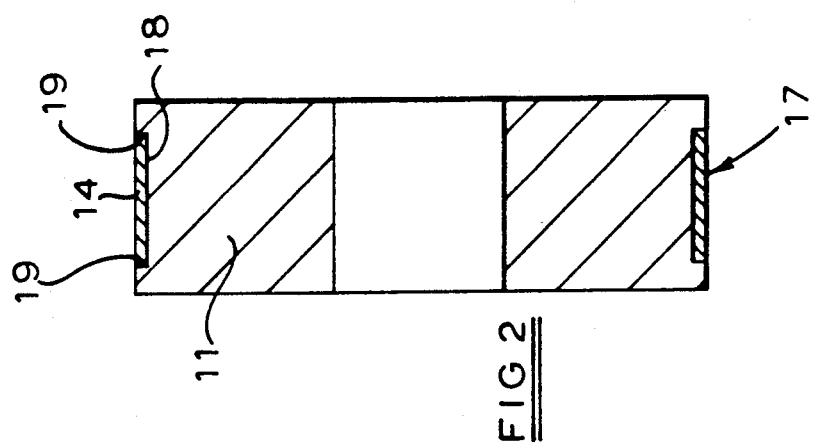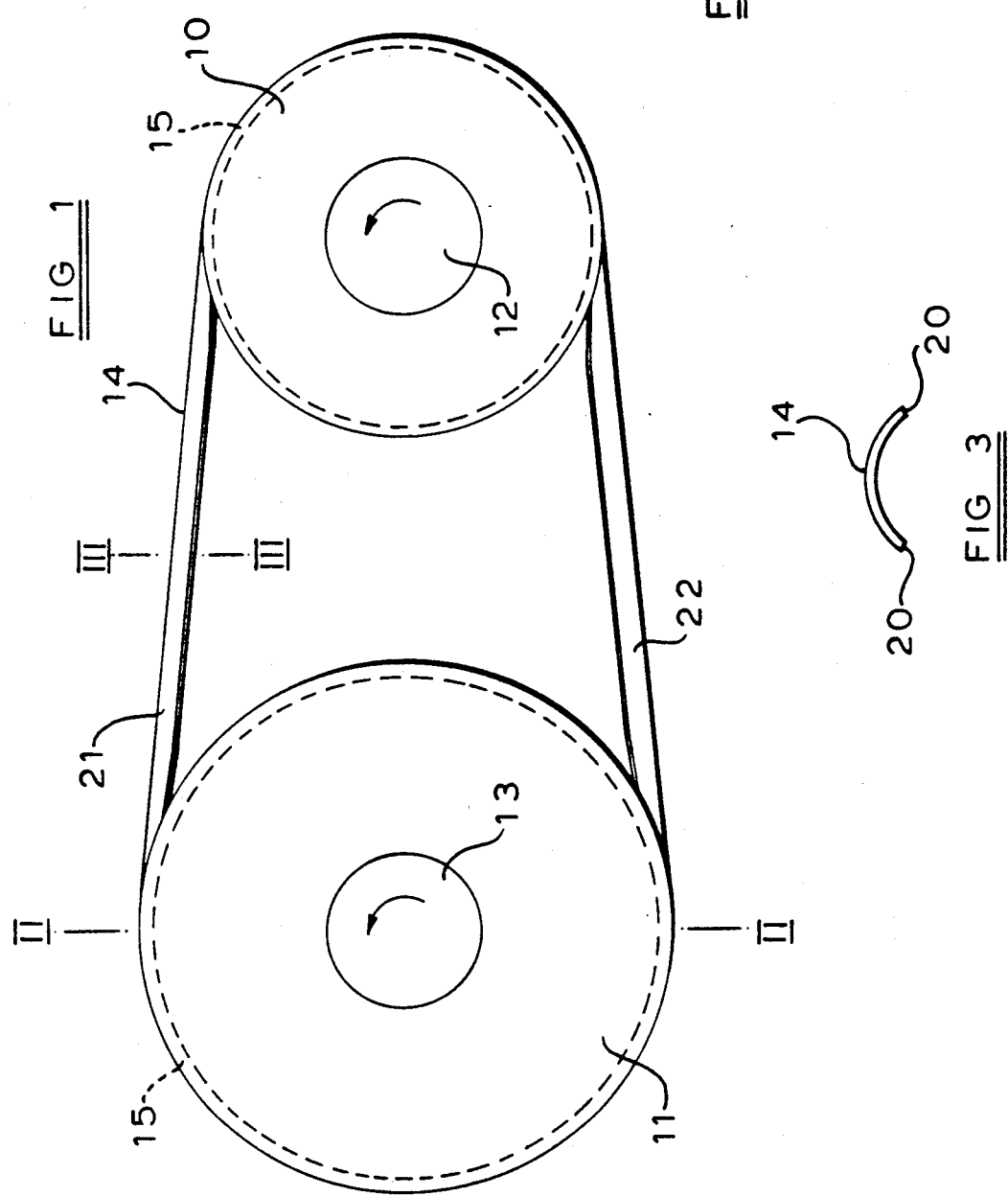

BELT DRIVES

BACKGROUND OF THE INVENTION

The present invention relates to belt drives.

In conventional belt drives, the belt will transmit loads only in tension. As a consequence, only one length of the belt between the pulleys interconnected thereby will be used to transmit torque from one pulley to the other.

The present invention provides a belt drive in which the belt transmits loads in both compression and tension.

SUMMARY OF THE INVENTION

According to one aspect of the present invention a belt drive has a pair of pulleys mounted for rotation in a common plane about parallel axes and a belt drivingly mounted about said pulleys, said belt comprising a band of material having a curved transverse section.

With the belt drive disclosed above, the straight lengths of belt between the pulleys will be curved to provide longitudinal rigidity, so that loads may be transmitted thereby in compression as well as tension. The belt is preferably made of low hysteresis resilient material with high elastic modulus, such as spring steel or a plastics material with similar properties. Guide means may be provided along the straight lengths of belt to maintain the transverse curvature of these lengths.

The belt is made of relatively thin material so that it may be bent to conform to the radius of the pulleys. As the belt is bent to pass around the pulleys, it flattens out in transverse section, so that the pulleys may be provided with plane cylindrical surfaces for engagement of the belt. This flattening effect may be enhanced by holding the belt in tension between the pulleys. This flattening of the belt as it passes over the pulleys causes the belt to become wider. Traction between the belt and pulleys may be improved by providing circumferential recesses in the pulleys, the width of these recesses being such that the flattened belt will be an interference fit within the recesses, the edges of the belt frictionally engaging the walls of the recesses.

The belt is preferably of concave section relative to the surface of the pulleys engaged thereby. In this way, the edges of the belt will remain continuously in engagement with the surface of the pulleys so that only shallow recesses will be required. The belt may alternatively be of convex section relative to the surface of the pulleys but as the edges of the belt will only be brought into engagement with the surface of the pulleys as it is bent around the pulleys, deeper recesses will be required to ensure that the belt remains within the recesses. In a further modification a composite belt having concave and convex sections joined together at their apices will provide improved longitudinal rigidity.

The belt drive of the present invention is suitable for use in continuously variable transmissions, at least one of the pulleys being provided with an expandable right cylindrical core.

BRIEF DESCRIPTION OF THE DRAWINGS

Various embodiments of the invention are now described, by way of example only, with reference to the accompanying drawings, in which:

FIG. 1 illustrates, in side elevation, a belt drive in accordance with the present invention;

FIG. 2 is a section along the line II—II of FIG. 1;

FIG. 3 is a section along the line III—III of FIG. 1;

DESCRIPTION OF THE PREFERRED EMBODIMENT

Figure 4:
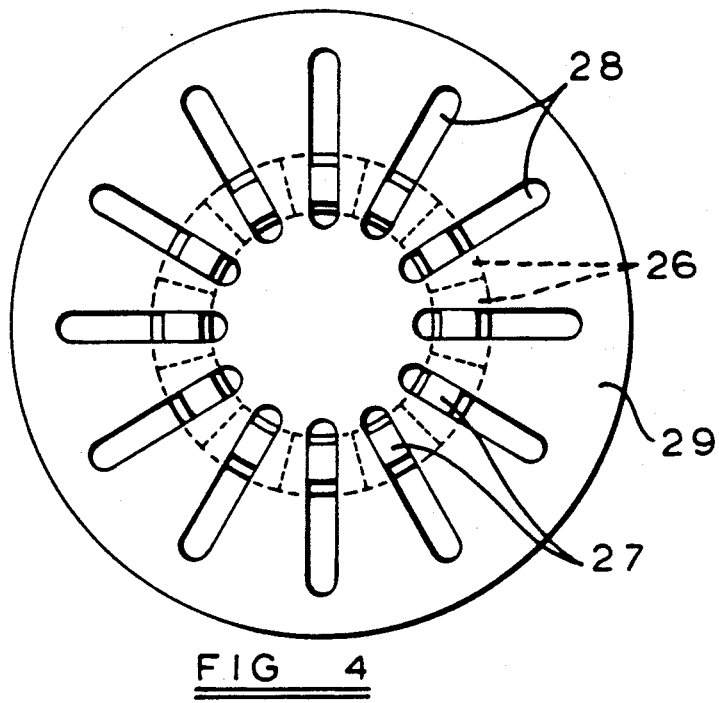
FIG. 4 illustrates, in side elevation, a pulley for a continuously variable transmission based on the belt drive illustrated in FIG. 1.

As illustrated in FIGS. 1 to 3, a belt drive comprises a pair of pulleys 10 and 11 mounted for rotation in a common plane on a drive shaft 12 and driven shaft 13, respectively. A belt 14 is located around the pulleys 10 and 11 and is held under tension thereby.

The belt 14 is made from spring steel and is concave in section relative to the right cylindrical surfaces 15 of the pulleys 10 and 11 engaged by the belt 14. As the belt 14 passes around the pulleys 10 and 11, bending of the belt 14 to conform to the radii of the pulleys 10 and 11 will cause the belt 14 to flatten out. This natural flattening of the belt 14 together with flattening due to tension which pulls the belt into engagement with the surfaces 15 of the pulleys 10 and 11, will cause the belt 14 to engage the right cylindrical surfaces 15 of the pulleys 10 and 11 across the full width of the belt 14.

The right cylindrical surface 15 of each of the pulleys 10 and 11 is defined by the base 18 of a shallow circumferential recess 17, the walls 19 of the recess 17 being perpendicular to the base 18. Upon flattening, the belt 14 becomes wider, the recesses 17 being dimensioned such that the edges 20 of the belt 14 will be forced into engagement with and will grip the walls 19 of the recesses 17, thereby preventing slippage between the belt 14 and pulleys 10 and 11.

The curved section of the straight lengths 21 and 22 of the belt 14 between the pulleys 10 and 11, will provide longitudinal rigidity of these lengths, so that loads may be transmitted from the pulley 10 to the pulley 11 under compression, by the length 21 of belt 14 and, under tension, by length 22. Guide means, for example rails or rollers (not shown) acting on the opposite edges 20 of the lengths 21 and 22 may be provided, in order to maintain the transverse curvature of these lengths and thus the longitudinal rigidity.

Figure 5:
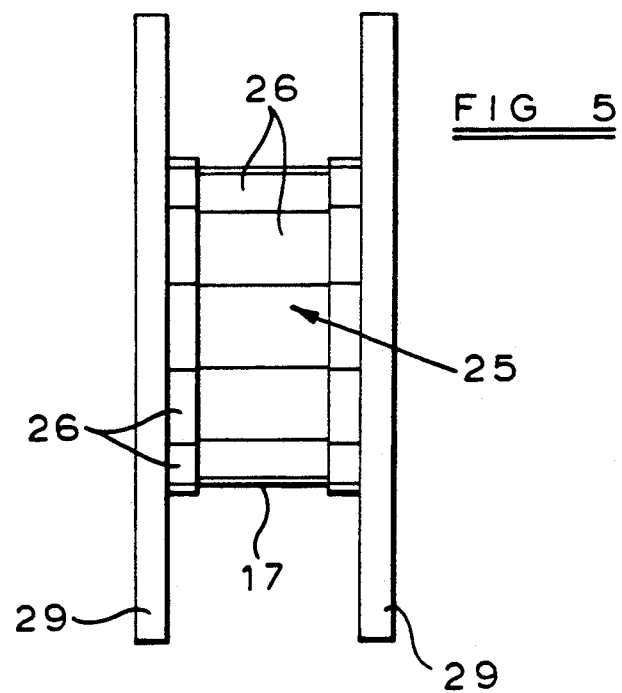
FIG. 5 is a plan view of the pulley illustrated in FIG. 4.

The belt drive disclosed above may be used in a continuously variable transmission. For this purpose, at least one of the pulleys 10 or 11 may be provided with an expandable right cylindrical core 25 as illustrated in FIGS. 4 and 5.

The core 25 which defines the right cylindrical surface 15 and circumferential recess 17, comprises a series of segments 26. The segments 26 are located relative to one another by means of lugs 27 one at either end of each segment 26, the lugs 27 engaging each in one of a series of angularly spaced radially extending slots 28 provided in a pair of end plates 29 located one on each side of the core. Control means (not shown) is provided to control movement of the segments 26 radially of the end plates 29, to expand or contract the core 25 and thereby vary the drive ratio of the pulleys 10 and 11, as desired. Suitable means, for example a third pulley, the axis of which is movable relative to the shafts 12 and 13, is provided for maintaining the belt 14 at the desired tension, as the radius of the core 25 varies.

I claim:

1. A belt drive having a pair of pulleys mounted for rotation in a common plane about parallel axes and a belt drivingly mounted about said pulleys, said belt comprising a band of material having a curved transverse section, the belt engaging in right angled circumferential recesses in the pulleys, the belt being arranged to flatten out as it passes around the pulleys so as to engage the base and side walls of the recesses.

2. A belt drive according to claim 1 in which guide means is provided to maintain the transverse curvature of the lengths of belt between the pulleys.

3. A continuously variable transmission comprising a belt drive according to claim 1, one of said pulleys including an expandable core defining a right cylindrical surface, means being provided for controllably expanding and contracting the core and means being provided for adjusting the tension of the belt as the core expands and contracts.

4. A continuously variable transmission according to claim 3 in which the pulley is formed from a series of segments, each segment having lugs at either end, said lugs locating in angularly spaced radially extending slots in a pair of end plates, one end plate being positioned on each side of the expandable core.

5. A belt according to claim 1 in which the belt is of concave section relative to the surface of the pulleys engaged thereby.

6. A belt drive according to claim 1 in which the belt is of composite structure having concave and convex sections joined together at their apices.

7. A belt drive according to claim 1 in which the belt is formed from a low hysteresis resilient material with high elastic modulus.

8. A belt drive according to claim 7 in which the belt is made of spring steel or plastics material with similar properties to spring steel.

* * * * *